United States Patent Office 3,369,798
Patented Feb. 20, 1968

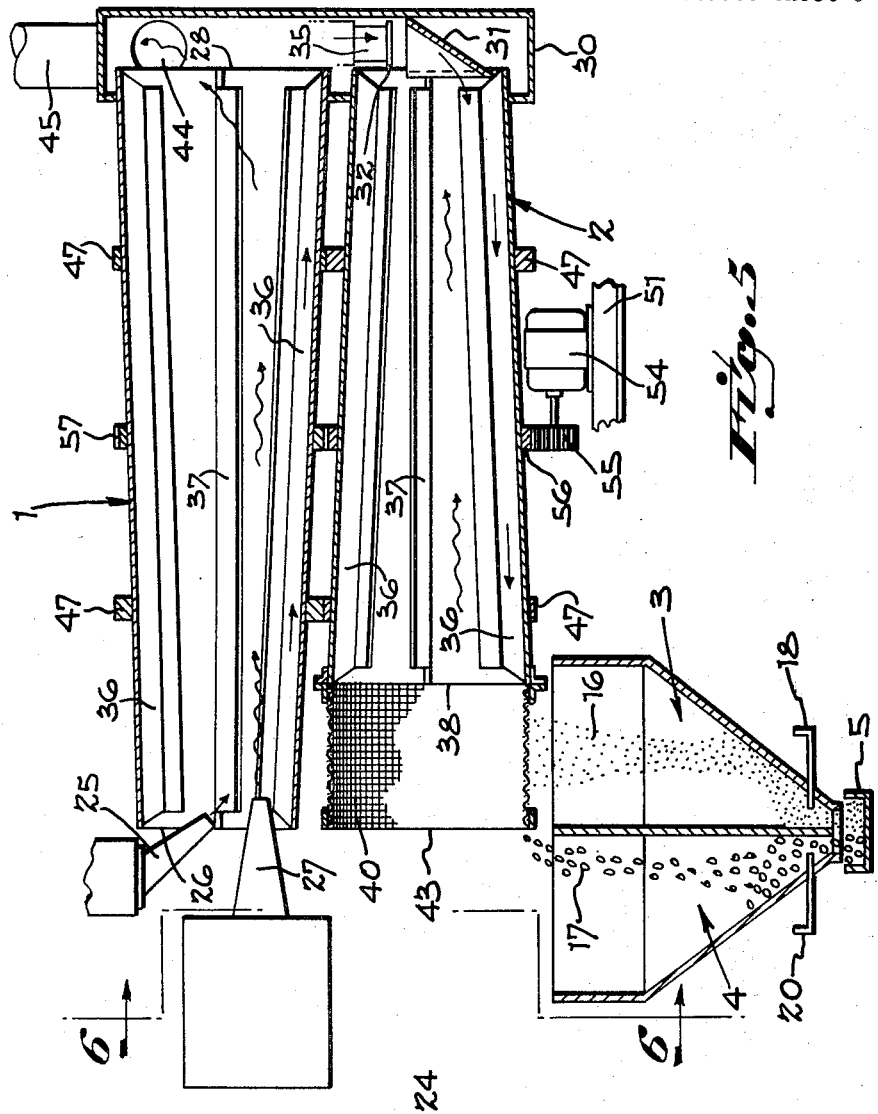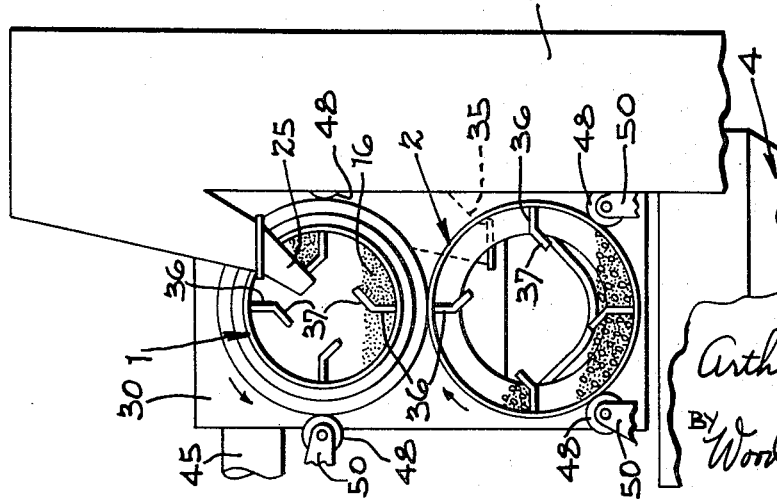

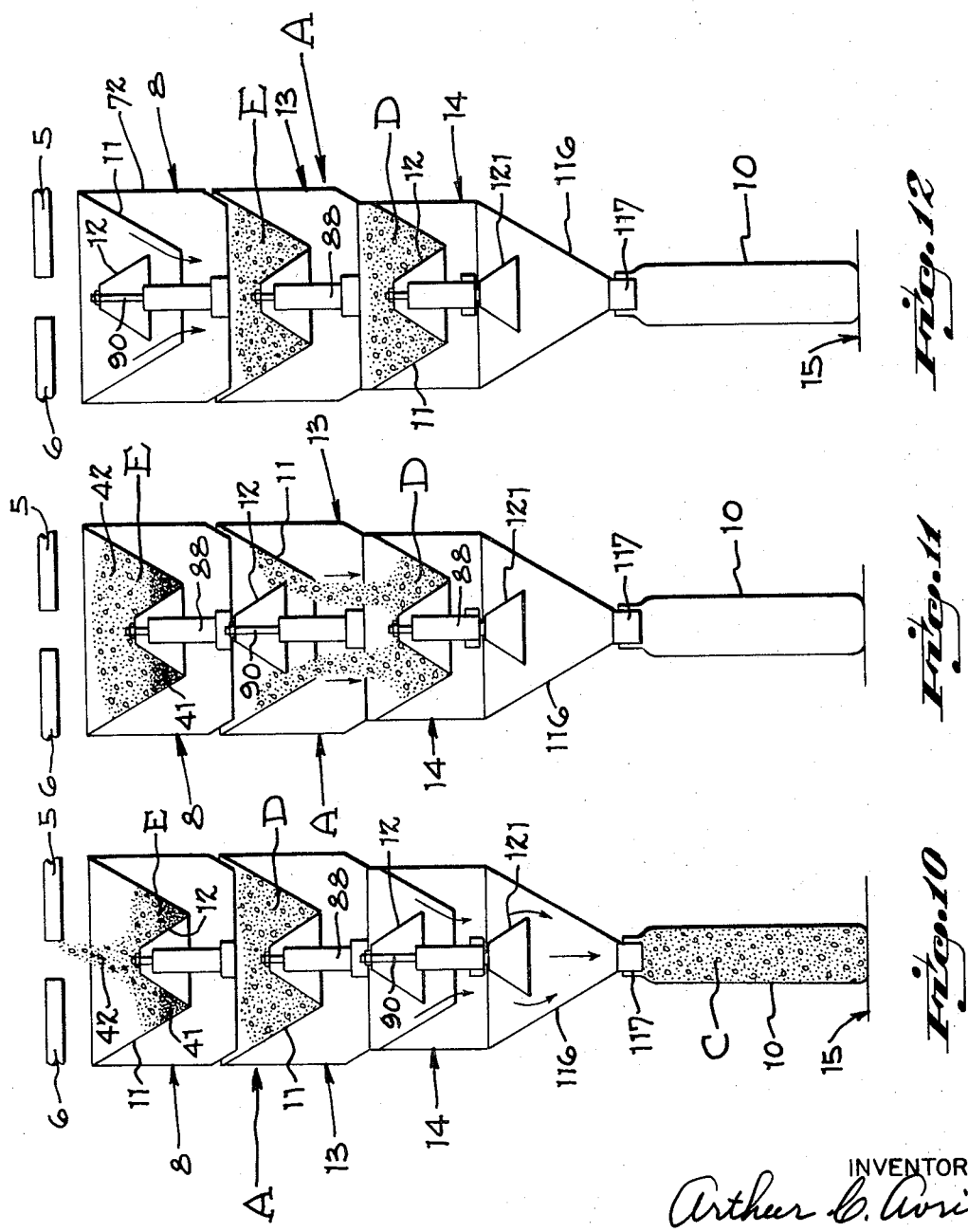

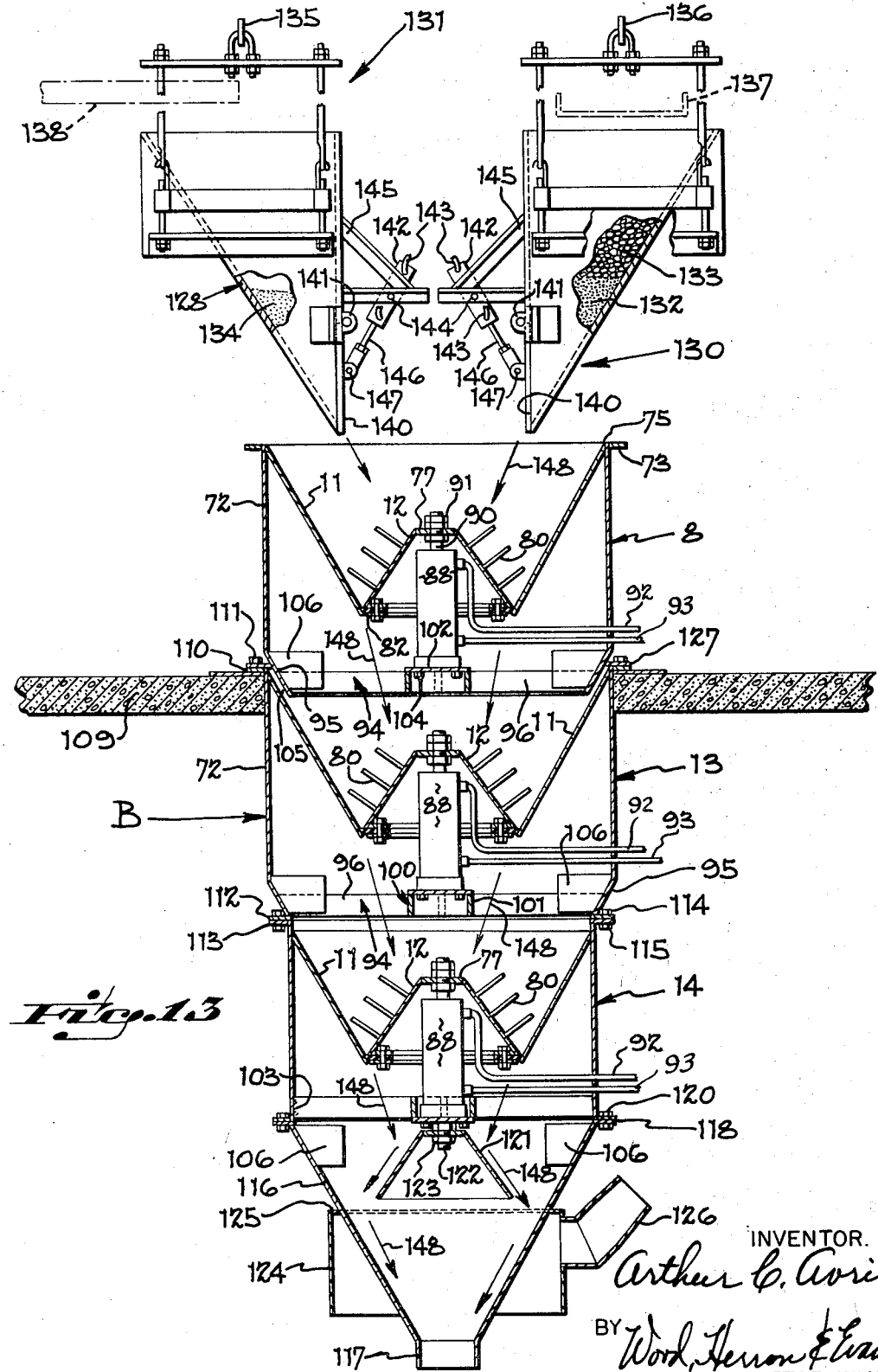

3,369,798
APPARATUS FOR AND METHOD OF
BLENDING DRY MATERIALS
Arthur C. Avril, Cincinnati, Ohio, assignor to A & T Development Corporation, Cincinnati, Ohio, a corporation of Ohio
Filed Dec. 13, 1965, Ser. No. 513,487
17 Claims. (Cl. 259—148)

This invention relates to the blending or mixing of a combination of dry materials, either of uniform or varying particle sizes and of the same or different specific gravities. The invention is disclosed, as a selected example, in relation to the manufacture of dry packaged concrete, utilizing a heat exchange apparatus for dehydrating the sand and aggregates. The invention is directed particularly to an apparatus and method of blending the mixture of dehydrated sand and aggregates with dry Portland cement immediately prior to the operation of packaging or bagging the mixture of dry concrete.

Generally speaking, the present blending apparatus is of the multistage type, the components of the apparatus operating along principles generally similar to those disclosed in the copending application of Arthur C. Avril, Ser. No. 432,168, filed on Feb. 12, 1965. A heat exchange apparatus for dehydrating the sand and aggregates, illustrated as an example in the present application, is disclosed in the prior Avril Patent No. 2,904,942, issued on Sept. 22, 1959. The present application also discloses, as a modification, an arrangement of scale hoppers following the principles disclosed in the Avril Patent No. 2,530,501, which was issued on Nov. 21, 1950.

The dry packaged concrete produced in accordance with the present invention is used extensively by householders to do small concrete jobs or concrete repair work themselves, at minimum trouble and expense. The dry packaged concrete is also utilized extensively in small commercial repair jobs which require a limited amount of concrete. To satisfy the market, the Portland cement, sand and aggregate in dry condition are blended and packaged, such that the user merely mixes the contents of the package with water and pours it at the job.

The sand and aggregates normally are in a moist condition when shipped from the source of supply, such as a local sand and gravel pit. In the preparation of conventional ready mixed concrete which is delivered in mixing trucks to the job, the moist condition of the sand and aggregates presents no problem since the moist materials and the dry Portland cement are mixed together at the plant, with water added to produce the required consistency. After being prepared at the plant, the batch of ready mixed wet concrete is immediately delivered and poured at the job, usually in large quantities.

On the other hand, in the preparation and packaging of dry cement according to the present invention, the sand and aggregates must be dehydrated thoroughly before mixing and packaging to prevent dehydration of the moist sand and aggregates with the dry Portland cement, bearing in mind that the packages of blended materials are placed in storage at the manufacturing plant and also may be stored for considerable periods of time at the retail outlets.

In preparing the materials for blending and packaging according to this invention, the predetermined quantities of aggregates (raw gravel particles) are screened into three sizes which are later recombined in proper weights for a concrete mix designed to exceed 400 pounds p.s.i., twenty-eight day strength. The recombined aggregates subsequently are dehydrated, mixed with dehydrated sand and dry Portland cement in the blending apparatus of this invention, then discharged into the bag, thus completing the cycle.

Generally speaking, the heat exchange dehydrating apparatus (Avril Patent No. 2,904,942, which is disclosed primarily in conjunction with the present blending apparatus) provides a method of dehydrating sand and aggregate in which the surface moisture and absorbed internal moisture are driven from the sand and aggregates at temperatures sufficiently low to preserve the quality of the particles and sufficiently low to allow the particles (after having been blended with Portland cement) to be bagged immediately after dehydration and weighing, but without damage to the bags, which would otherwise occur because of the high temperature of the blend when the ingredients are dehydrated separately without taking advantage of the heat exchange principle.

In general, the heat exchange apparatus of the prior Avril Patent 2,904,942 is arranged to heat damp sand to a temperature in the range of 175 to 375 degrees F. depending upon its dampness, the sand heating exchange operation being sustained for a period sufficient to thoroughly dehydrate the sand particles. The hot dehydrated sand is then combined with the raw damp aggregate (preferably gravel particles recombined as noted above) the ratio being in the neighborhood of 40 to 55 percent aggregate to 60 to 45 percent sand. When the dehydrated hot sand is commingled and agitated with the raw gravel or aggregate, the raw aggregate is dehydrated by heat transfer from the sand; moreover, the heat exchange action reduces the mixture of sand and aggregate to a temperature in the range of 130 to 150 degrees F. This permits the mixture of dehydrated sand aggregate and dry Portland cement to be combined or blended with Portland cement then dumped immediately into the bag.

One of the primary objectives of the present invention has been to provide a blending or mixing apparatus and method, utilizing an arrangement of mechanical blending sections to produce thorough commingling of the dehydrated sand, aggregates and cement through several stages, finally discharging the blended mixture into a bag.

It has been found by experiment that a multiple stage system of blending is preferable, particularly in blending a dry concrete mix. Otherwise expressed, when a multiple stage system is used, the material starts to flow and is completely stopped at each progressive stage in the blending cycle so that all particles can commingle. Thus, in order to complete the blending, the repetitive cycles are utilized.

As to the materials to be blended, there are different numbers of stages required to provide a thorough operation, such as two, three or four stages. In blending Portland cement dehydrated sand and aggregates for a dry concrete mix (selected as a preferred example) it has been found that the ideal number of stages is three; after passing through three stages, it is almost impossible to determine the composition of the materials, due to the thorough blending action.

According to the apparatus selected to illustrate the principles of the invention, the blending apparatus comprises a set of three blending sections, each section essentially comprising a receiver (generally in the form of an inverted cone) having a discharge opening at its lower end, a discharge control element (preferably in the form of an upright cone) mounted for vertical movement with respect to the discharge opening of the receiver, with power means for shifting the discharge control element vertically from a normally closed retaining position to an elevated discharge position.

The discharge control cone of each blending section may be shifted from the closed loading position to the elevated discharge position by any one of several power means. Generally speaking, a mechanical power operated device may be connected with the central portion of the discharge control cone and arranged to shift the control cone upwardly from its closed loading position to its open discharge position with reference to the receiver cone. In place of the mechanical power unit, a power cylinder, such as an air cylinder, as disclosed in the present application, preferably is utilized to actuate the discharge control cone. It has been determined that the use of air cylinders in the present invention is preferable since each air cylinder fits, at least partially, within the discharge control cone to reduce head room, thereby making it possible to keep the overall length of the multiple stage blending unit within desirable limits.

In the process of blending according to the present invention, each receiver cone acts as a vessel to contain the mass of material which has previously been dehydrated and weighed. In discharging the contents of any given receiver cone by elevating the discharge control cone, the mass of material (Portland cement, dehydrated sand and aggregates) cascades by gravity in the form of a circular, relatively thin flow stream which is discharged from around the base of the upright discharge control cone and downwardly through the opening of the inverted receiver cone. The material thus flows into the receiver cone below it, in which the flow control cone is in its closed position so as to arrest the flow of material temporarily.

As the material cascades from the receiver cone, the particles become thoroughly intermingled such that the fines take up the spaces between the coarse aggregate (gravel) particles, thereby to create a process of blending which provides a maximum commingling and compaction to form a mixture which is, as nearly as possible, a perfect blend.

A further objective of the present invention has been to provide a blending apparatus in which the upright discharge control cone of each section serves the double purpose of controlling the discharge of the material from the receiver cone to the receiver cone below, and in which the upright discharge control cone also acts as a deflector to intercept the circular flow stream of material so as to increase the blending action.

According to this aspect of the invention, the flow of material from the discharge opening of a given inverted receiver cone follows a path which is intercepted by the upwardly inclined surface of the upright discharge control cone of the section below. In impinging against the upwardly sloping surface of the control cone, the particles are deflected outwardly then strike the downwardly sloping surface of the receiver cone before coming to rest in the lower portion of the receiver cone.

A particular advantage in the combination of the inverted receiver cone, upright discharge cone and power cylinder arises from the fact that the power requirements in actuating the several blending sections is reduced to a minimum. In other words, the major portion of the weight load of the Portland cement, dehydrated sand and aggregates is sustained by the fixed receiver cone, making it unnecessary to elevate the entire mass by power when the discharge cone is elevated to deliver the batch from the receiver cone to the one below.

A further objective of the invention has been to provide a multiple stage blending apparatus in which any number of self-contained blending sections may be assembled, one above the other to form a unit best suited to the particular blending operation for which the apparatus is intended.

According to this aspect of the invention, the composite group of self-contained blending sections permits the upper section to be suspended from a weighing apparatus so as to act as a scale hopper which is spaced slightly above the lower blending sections. Accordingly, the upper blending section is arranged to receive the ingredients from the weighing apparatus so as to meter the ingredients, subsequently to discharge the mixture to the lower blending sections which are mounted below the upper section.

In one embodiment of the invention disclosed herein, the upper section of the blending unit is suspended from the weighing apparatus and the dehydrated sand, aggregate and Portland cement are fed directly into the upper section (with the discharge control cone in its closed position) until the metered amounts of the ingredients are fed into the first blending section. At this time, the feeders for the sand, aggregates and Portland cement are decommissioned in an automatic manner by the weighing apparatus.

During the weighing and bagging cycle, the feeding of the materials to the weighing apparatus is initiated manually by the operator. After weighing, the metered materials are discharged into the bag, also under manual control of the operator. In other words, the apparatus cannot be recycled until the operator has discharged the contents of the weighing apparatus into the bag.

A further advantage in utilizing multiple blending sections arises from the fact that three or more batches of ingredients may be acted upon concurrently, thus bringing about a saving in the time factor while providing the maximum blending action.

A further objective of the invention has been to provide a blending apparatus of the multiple stage type comprising individual self-contained units as outlined above, which may be incorporated in a relatively simple, convenient manner in existing plants as well as in newly erected plants.

In the embodiment outlined above, in which the upper blending section is suspended from the weighing mechanism, the blending apparatus is intended primarily for use in conjunction with the heat exchange dehydrating plant of the type disclosed in the prior Avril Patent No. 2,904,942.

A modified form of the blending apparatus of this invention is intended to be interchanged with the weighting apparatus disclosed in the prior Avril Patent No. 2,530,- 501. In the modified arrangement, two scale hoppers are suspended from the automatic weighing apparatus, while the upper section of the blending apparatus is mounted in a fixed position as distinguished from being suspended, as outlined above.

In operating a plant of this type, the dehydrated sand and aggregates are fed together in metered proportions into one of the suspended scale hoppers, while the dry Portland cement is fed in a metered quantity into the second scale hopper. Since both hoppers are suspended from the weighing apparatus, the feeders are de-energized automatically when the predetermined quantities of the material have been fed into the individual scale hoppers. The operator then initiates the dumping cycle manually.

In the modified form of the invention, the blending apparatus also comprises a plurality of blending sections mounted one above the other. However, in this case the upper blending section as well as the lower sections are supported in the fixed position below the weighing apparatus. In the modified arrangement (Avril Patent No. 2,530,501), the contents of the cement hopper and the sand and aggregate hopper are both discharged into the upper blending section at the end of the weighing cycle, thereafter to pass progressively through the three blending sections to be discharged into the bag.

To summarize, the two forms of the blending apparatus disclosed herein are both based upon the same principle whether the upper section is suspended from the weighing apparatus to act as a scale hopper or whether the upper section is mounted in a fixed position to receive the materials from the separate suspended scale hoppers of the modified arrangement. In each instance, the upright discharge control cone acts as a deflector with reference to the inverted receiver cone above it to promote the blending action at each stage of progression of a given batch through the apparatus.

In both forms of the invention, the lower blending section includes a funnel-shaped collector chute leading to the discharge spout which is adapted to receive the bag to be filled. The collector chute also acts as a deflector with respect to the blended batch of material which is discharged from the lowermost blending section, such that each batch receives a final blending treatment concurrently with the bagging operation.

The improved blending action of the present apparatus provides a mixture which is free of voids, resulting in greater compaction or density in the mass.

In the arrangement disclosed, in which there is provided a series of blending sections mounted above one another, air pressure and vacuum assist in feeding the material through the blending unit. Thus, when a lower blending section discharges, partial vacuum is created in the apparatus which assists the flow of material from the section above it. At about the same ime, a section above discharges, thereby to create air pressure, which further accelerates the flow of material.

The various features and advantages of the invention will be more fully apparent to those skilled in the art from the following detailed disclosure taken in conjunction with the drawings.

In the drawings:

FIGURE 5 is an enlarged longitudinal section view similar to FIGURES 1 and 2, detailing the mechanical details of the heat exchange dehydrating mechanism.

FIGURE 6 is an end view of the heat exchange dehydrating apparatus as viewed along the line 6—6 of FIGURE 5.

FIGURES 10, 11 and 12 are diagrammatic views illustrating the action of the blending units during the successive steps of blending and bagging the dry concrete mixture.

FIGURE 13 is a diagrammatic side elevation illustrating the present blending apparatus in conjunction with the individual feeders for the sand, aggregate and cement according to the prior Avril Patent No. 2,530,501.

*Heat exchange packaging plant generally.—(Parallel drum type)*

Figure 1:
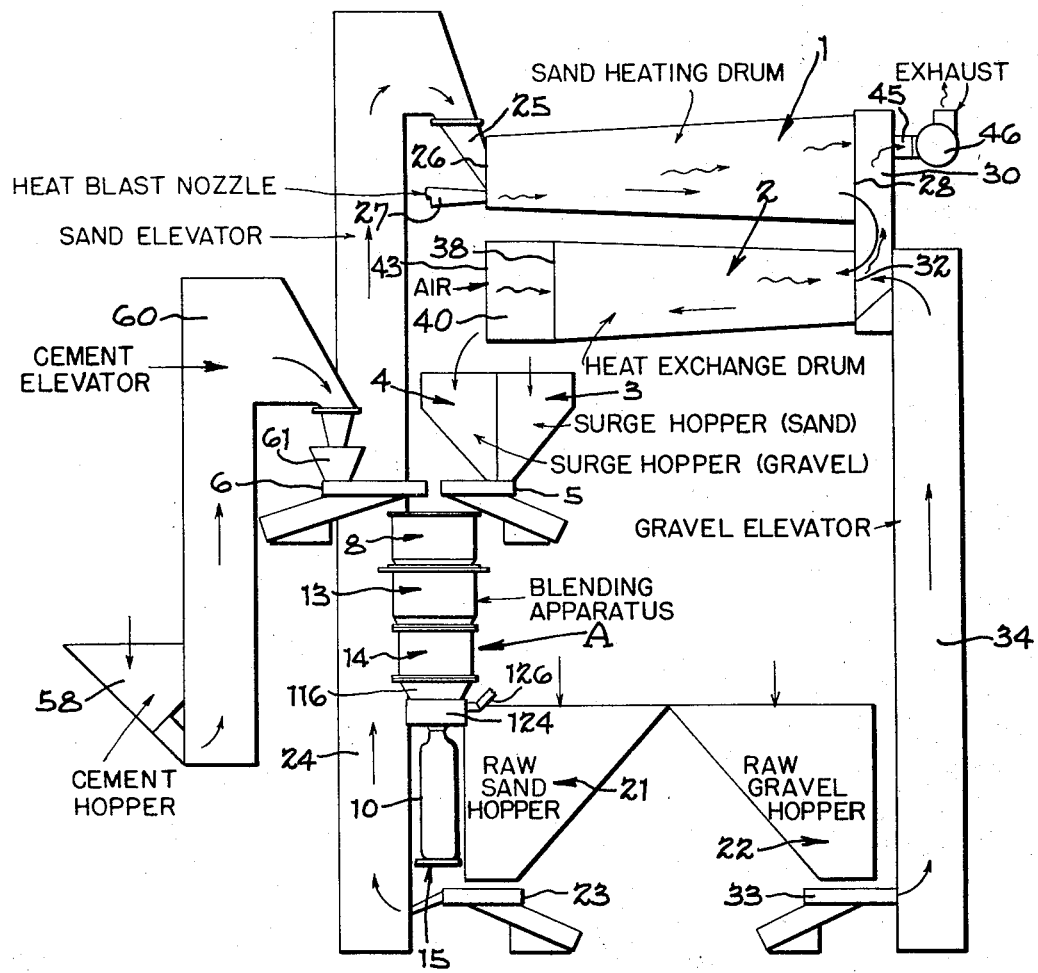
FIGURE 1 is a diagrammatic view of a dehydrating and packaging plant of the type disclosed in Patent No. 2,904,942 with the improved blending apparatus of this invention installed at the bagging stage.

Referring to FIGURE 1, the parallel drum heat exchange apparatus is shown diagrammatically in relation to the present blending apparatus. This heat exchange apparatus corresponds to that disclosed in the prior Avril Patent No. 2,904,942, issued on Sept. 22, 1959. The packaging plant disclosed in the present embodiment of the invention comprises, in general, a pair of rotating drums 1 and 2, the upper drum 1 comprising a sand heating drum and the lower drum 2 comprising a heat exchange drum. In general, the raw sand and raw aggregates are dehydrated during passage through the sand heating drum, and heat exchange drum 2 and thereafter are separated and are fed from a pair of surge hoppers 3 and 4 by means of a vibratory feeder 5 to the blending apparatus of this invention, which is indicated generally at A (FIGURE 1). The dry Portland cement is fed into the blending apparatus A by operation of a cement feeder, also of the vibratory type, which is indicated at 6.

As described later in detail, the blending apparatus A in the form of the invention disclosed in FIGURE 1, is suspended from a weighing apparatus 7 (FIGURES 2 and 3), as described later in detail. The weighing apparatus determines the proper proportions of dry Portland cement and of the dehydrated sand and aggregates which are fed into the blending apparatus A prior to the bagging operation. In other words, the weighing apparatus 7 is arranged to shut down the feeder 5 of the sand and aggregates and the feeder 6 of the cement in response to the weight load of the ingredients as they are charged into the blending apparatus A. After the ingredients are charged in and the feeders 5 and 6 are decommissioned, the dumping and bagging operation is initiated by the operator, causing the ingredients to be thoroughly intermixed and dumped into the bag.

Figure 2:
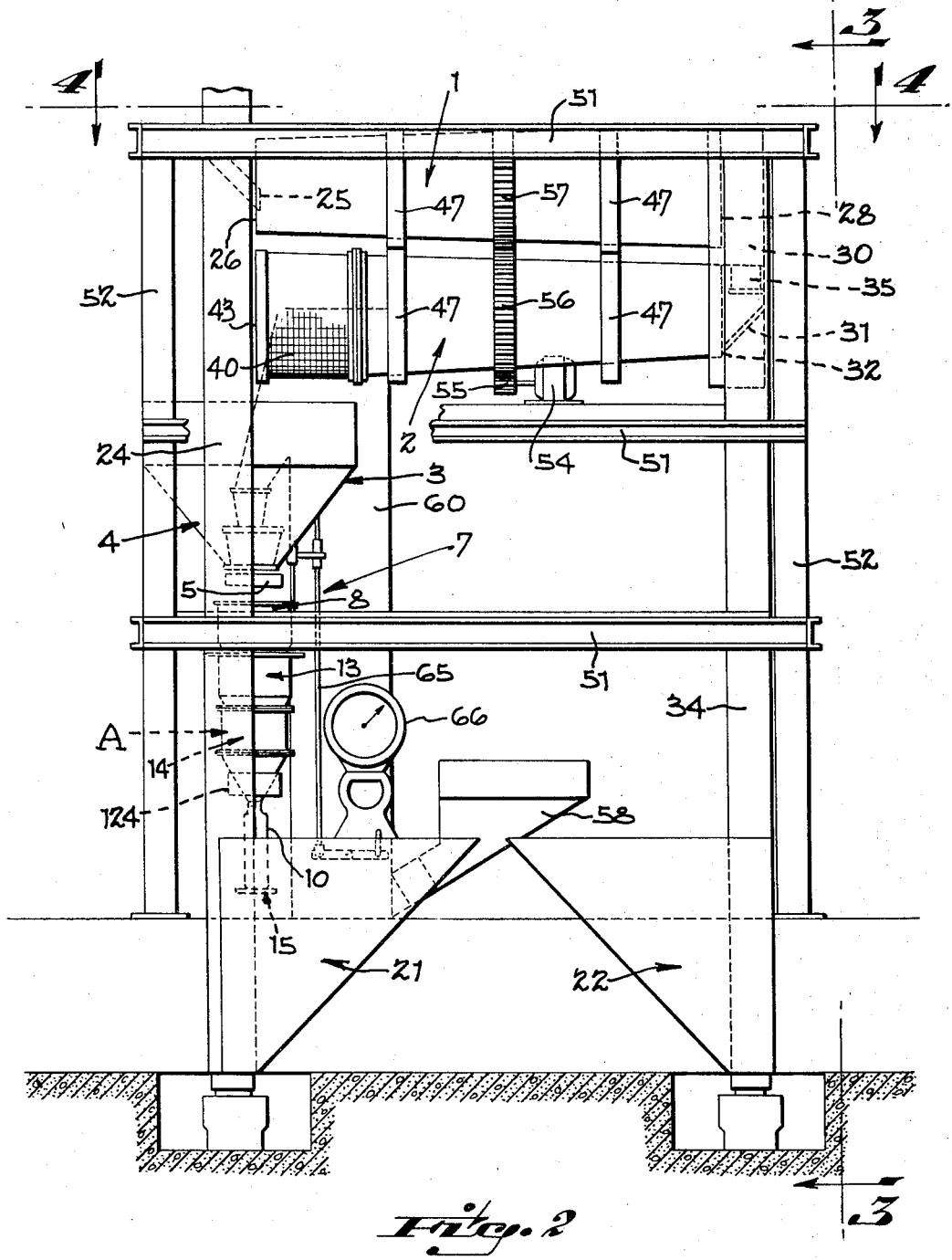
FIGURE 2 is a side elevation of the packaging plant of FIGURE 1, showing in greater detail the mechanical aspects of the heat exchange apparatus.

It will be understood that the arrangement of overhead heat exchange drums shown in FIGURES 1 and 2 is intended to represent a typical system. However, in other installations, depending upon topography or other factors, the heat exchange drums may be mounted at ground level for direct feeding of the sand and gravel into the heat exchange apparatus. In this event, the dehydrated sand and gravel, issuing from the heat exchange drums, together with the Portland cement, are elevated to the blending apparatus which is located above.

*Control system*

The weighing and discharging or bagging operations are controlled by the operator by means of push buttons. Since the control system forms no part of the present invention, it has been omitted from the disclosure. Generally speaking, during the bagging operation, the operator depresses a first push button which initiates the weighing cycle, whereby the dehydrated sand, aggregates (usually gravel) and dry Portland cement are charged into the blending apparatus. In the form of the invention disclosed in FIGURES 1–6, the ingredients are charged directly into the upper section 8 of the blending apparatus A, which acts as a scale hopper for the weighing apparatus. The weighing apparatus shuts down the feeders 5 and 6 automatically when the metered quantities of sand, gravel and cement have been charged into the upper blending section 8. The upper section 8 is suspended from the weighing apparatus 7 as illustrated generally in FIGURES 2 and 3, which is arranged, as noted above, to control the operation of the vibratory feeders 5 and 6.

When the materials, in proper proportion, have been fed into the upper section 8 of the blending apparatus, the control system (not shown) provides a signal, such as a light, to indicate that the blending apparatus is charged and ready for the packaging or bagging operation. The operator then depresses a second push button which initiates the dumping operation, causing the sand, aggregates and Portland cement to be discharged into a bag 10 (FIGURES 1–3) which is placed at the discharge end of the blending apparatus A.

Each blending section of the apparatus includes an inverted receiver cone 11 (FIGURE 7) and an upright discharge control cone 12 which is shiftable with respect to the receiver cone 11, as described in detail later. Each section of the blending apparatus A comprises a self-contained unit, the upper section 8 in the embodiment of FIGURES 1–3 and 7 being suspended from the weighing apparatus, as explained later.

In the present disclosure (FIGURES 1, 2 and 3), the blending apparatus comprises three sections, the upper section 8, the intermediate section 13 and the lower section 14. The upright discharge control cone 12, which is shiftable with respect to the receiver cone 11 of the several sections 8, 13 and 14 of the blending apparatus A are shifted in predetermined sequence by respective actuating cylinders which, in the present example, are pneumatically operated by the control system. In general, the batch of ingredients which is charged into the upper section 8 in segregated, or at least in partially segregated condition is discharged successively from the upper section 8, then through the sections 13 and 14 for discharge into the bag in thoroughly blended or commingled condition.

The pneumatic operation of the discharge control cones 12 (FIGURE 7) is electrically controlled by the circuit which is interconnected with the weighing and dumping buttons or switches. By providing manual control, the operator is given the opportunity to start the weighing cycle (first switch) then to place the bag upon a conveyor, indicated generally at 15 located below the lower section 14 of the blending apparatus. Thereafter, he depresses the dump or bagging switch (second button) such that the materials are delivered by gravity directly into the bag 10 from the lower section 14 of the blending apparatus.

*Packaging machine generally*

The heat exchange dehydrating and packaging machine selected to provide an embodiment of the present blending apparatus is illustrated in FIGURES 1-6 and corresponds with the machine disclosed in prior Avril Patent No. 2,904,942. It will be understood however, that the present blending apparatus may be utilized in conjunction with various other types of packaging machines, for example, the type disclosed in FIGURE 13 (Avril Patent No. 2,530,501).

Described generally (FIGURES 1-6), the heat exchange dehydrating and packaging plant continuously dehydrates raw sand 16 and raw aggregates 17 through the heat exchange principle, whereby the sand is first heated in the sand heating drum 1 and is then commingled with the raw gravel in the heat exchange drum 2. The dehydration of the materials is coordinated with continuous packaging or bagging (bag 10—FIGURE 1) of the dehydrated materials mixed with dry Portland cement 41 in measured proportions. In general, as noted above, the packaging plant (FIGURES 1-6) operates through successive weighing cycles, automatically weighing the dry Portland cement, dehydrated sand and dehydrated gravel so as to create a batch of dry concrete upon each cycle of operation, under control of the operator. During each weighing cycle, the materials are first fed into the upper section 8 of the blending apparatus A which is suspended, in the present example, from the weighing apparatus 7.

It will be understood at this point, that the present packaging apparatus may utilize three blending sections, as indicated at 8, 13 and 14; however, the apparatus may be modified to operate either with one blending section, such as the upper section 8 or it may be supplied with blending sections in excess of the three illustrated, depending upon the type of materials handled and other variable factors.

*Operation*

The sequential raising and lowering of the discharge control cones 12 in relation to the three stage blending apparatus A is shown diagrammatically in FIGURES 10, 11 and 12. As noted previously, in the present disclosure, the upper section 8 of the blending apparatus is suspended from the weighing apparatus 7 in order to meter by weight the quantity of Portland cement, dehydrated sand and gravel. Thus, a predetermined quantity of Portland cement 41 is first fed into the upper section 8 of the blending apparatus by operation of the cement feeder 6. Thereafter, a predetermined quantity of sand and gravel 42 in mixed condition is fed into the receiver cone by operation of the sand and gravel feeder 5 (FIGURE 10). In the present example, the sand and gravel 42, as fed in both feeders 5 is at least partially mixed by operation of the surge hoppers 3 and 4 (FIGURE 1) which include adjustable gates 18 and 20 (FIGURE 5) arranged to control the flow of sand and gravel to the feeder 5. In the packaging plant shown in FIGURES 1-6 and also in FIGURE 13 (modified plant) the dehydrated sand and gravel advances from the heat exchanger through the feeding and metering apparatus to the bag 10 while still warm. The bag is fabricated from heavy paper and is lined with a moisture resistant material to prevent absorption of atmospheric moisture by the dehydrated concrete mixture within the bag. After the mixture is discharged by gravity into the bag, the bag is closed and sealed, preferably by a stitching operation, and in this condition is ready for marketing or for warehousing. As a typical example of a dry concrete mixture, each batch may consist of approximately 14 pounds of Portland cement, 30 pounds of sand and 46 pounds of gravel, these dehydrated, commingled and/or blended materials being packaged in a 90 pound bag.

Figure 3:
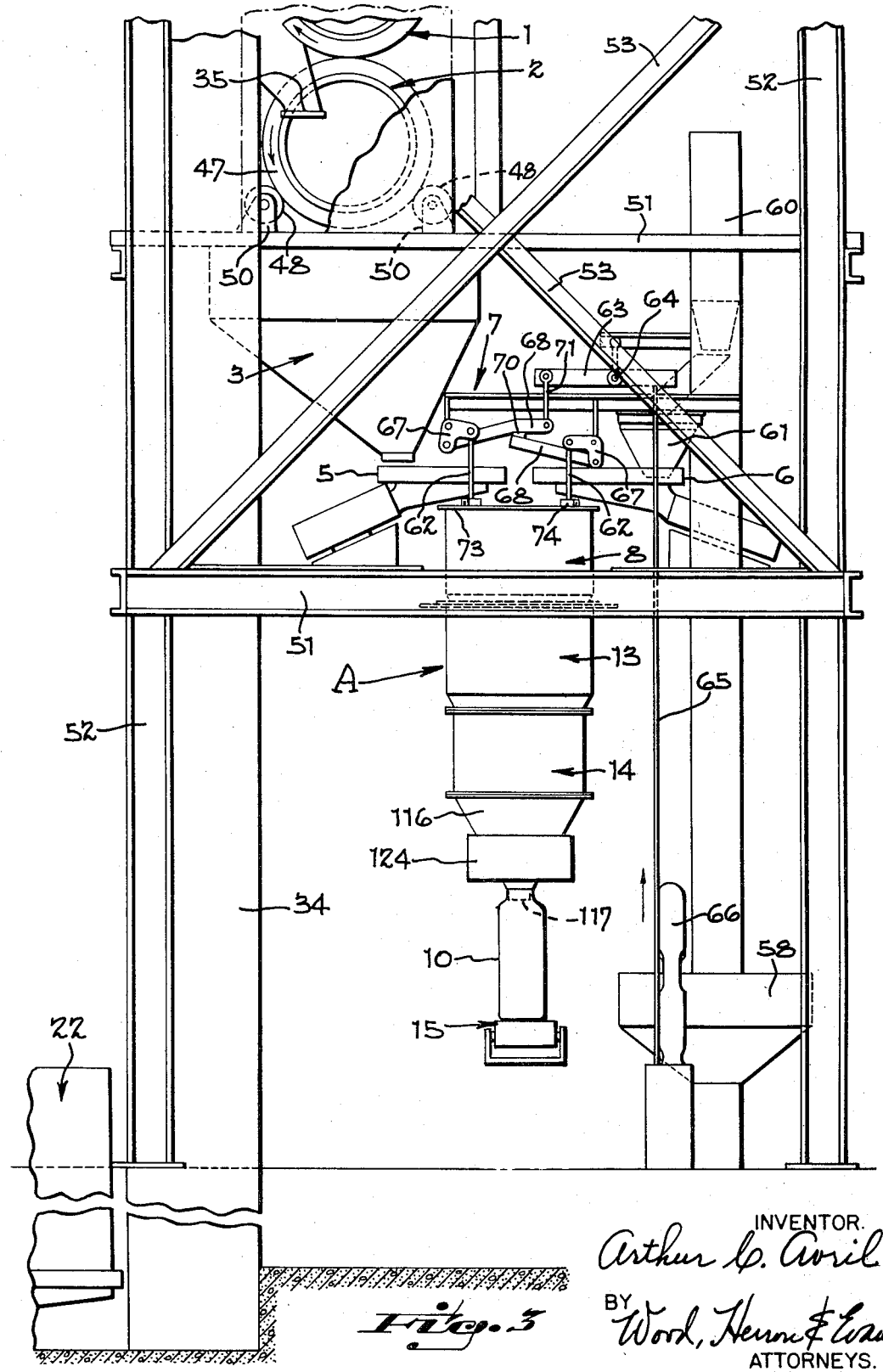
FIGURE 3 is an enlarged fragmentary end elevation of the packaging plant as projected along line 3—3 of FIGURE 2, further detailing the mechanical details of the heat exchange apparatus with particular reference to the weighing mechanism.

According to the apparatus shown in FIGURES 1, 2, and 3, the raw sand and raw gravel are transported in damp condition from the source of supply and are fed into the primary storage hoppers of the packaging plant for continuous dehydration and treatment. The storage hopper for the raw sand is indicated generally at 21 and the storage hopper for the raw gravel is indicated at 22. From the sand storage hopper 21, the sand is conveyed by a vibratory feeder 23 to a sand elevator 24. The sand elevator 24 from hopper 21, at its upright end includes a spout 25 which projects downwardly from the sand elevator into the charging end 26 of the sand heating drum 1. Also extending axially into the charging end is a heat blast nozzle 27 extending from a gas or oil heater (not shown) and arranged to project a blast flame longitudinally through the sand heating drum 1. During passage of the sand through the drum 1 the sand is agitated for uniform exposure to the blast flame and upon reaching the discharge end 28, the hot sand flows into a collector housing 30 which encloses the right hand end portions of both drums 1 and 2. The collector housing 30 includes a downwardly inclined deflector chute 31 (FIGURE 5) which intercepts the flow stream of hot dehydrated sand and deflects the sand into the charging end 32 of the heat exchange drum 2.

In carrying out the heat exchange operation, a continuous stream of raw gravel is conveyed by the vibratory feeder 33 (FIGURE 1) to a gravel elevator 34. The gravel elevator communicates with a gravel spout 35 (FIGURE 5) disposed within the collector housing 30, such that the raw unheated gravel is commingled with the hot dehydrated sand issuing from the sand heating drum 1 into the collector housing 30. The heated sand and commingled raw gravel thus pass through the heat exchange drum to wherein the heat exchange operation is carried out. During passage through the heat exchange drum 2 the hot sand dries off the surface moisture and also most of the absorbed moisture from the gravel particle, Moreover, the heat exchange from the hot sand to the raw gravel reduces the temperature of the sand to a degree which permits the dehydrated mixture to be bagged immediately after being dehydrated but while still warm, thus eliminating the storage period which would otherwise be necessary to reduce the mixture to a safe bagging temperature. Moreover, the immediate bagging of the mixture prevents reabsorption of atmospheric moisture.

During the heat exchange operation, the raw damp sand is heated by the blast flame to a temperature in the neighborhood of 175 degrees to 375 degrees F. for a period sufficient to dehydrate the sand as it advances continuously through the sand heating drum 1. The dehydrated hot sand is then discharged from the sand heating drum 1 into the heat exchange drum 2, as noted above, such that the raw gravel is dehydrated by heat transfer from the hot sand as the mixture is agitated and advanced through the heat exchange drum 2 toward the blending apparatus A (FIGURES 1 and 2). Upon discharge from the heat exchange drum 2 the mixture is reduced to a temperature substantially in the range of 130 degrees to 170 degrees F. At this temperature, the material may be packaged without injury to the fibers of the paper bags and to which it is loaded.

Briefly therefore, the heat exchange principle provides continuous treatment of the sand and aggregates at controlled proportions and temperatures and permits the sand and aggregate dehydration treatment to be co-ordinated with the production rate of the packaging equipment. The quality of the gravel is preserved because its dehydration temperature is held below the critical point and is raised gradually while the temperature of the sand is progressively lowered so as to permit the mixture to be bagged as soon as it is discharged from the heat exchange apparatus to the blending apparatus A.

As best shown in FIGURE 2, the sand heating drum 1 and the heat exchange drum 2 are rotatable about parallel horizontal axes and the drums or cylinders are tapered longitudinally. Accordingly, the sand heating drum 1 has a diameter which increases from its discharging end 26 to its discharge end 28 which communicates with the collector housing 30.

The heat exchange drum 2 tapers longitudinally in a direction opposite to the taper of the sand heating drum 1, the degree of taper of the two drums being substantially equal. The longitudinal taper of the rotating drums thus creates a gravity flow of material longitudinally in two directions through the drums, the rate of flow being governed by the combined taper and rate of rotation of the drums.

As best shown in FIGURES 5 and 6, each drum 1 and 2 is provided with a set of agitator vanes 36 which are spaced apart radially and which extend longitudinally throughout the length of the drums. The inner edge portion of each vane is bent angularly as at 37 to increase the scooping action. During rotation, the vanes of the sand drum 1 agitate the raw sand to expose the particles to the blast flame for uniform heating. The blast flame (heat blast nozzle 27) is adjusted to raise the mass of sand to the required temperature as the sand reaches the discharge end 28 of the drum. It will be understood that the temperature of the blast flame may be raised or lowered in accordance with the amount of moisture contained in the material, which factors are variable.

In order to separate the dehydrated sand from the gravel at the discharge end 38 of the heat exchange drum 2 (FIGURES 1 and 5) there is provided a cylindrical separator screen 40 which is attached to the discharge end of the heat exchange drum. In passing through the separator screen, the mixture (sand and gravel) is agitated causing the sand 16 to pass through the screen into the surge hopper 3 which collects the sand. The gravel particles 17 which cannot pass through the screen 40 and are thus advanced to the discharge end 43 of the screen to drop by gravity into the gravel surge hopper 4. As noted earlier, the sand is fed from the surge hopper 3 to the vibratory feeder 5, the quantity being controlled by the adjustable gate 8. The gravel similarly is fed with the sand to the feeder 5, the rate of flow being governed by the adjustable gate 20 the materials being advanced directly to the blending apparatus A for immediate blending and bagging.

As best shown in FIGURE 5, the collector housing 30 completely encloses the ends of the drums 1 and 2 and receives the blast of hot exhaust gases from the sand drum 1. The housing 30 includes an exhaust passageway 44 connected to an exhaust duct 45 which leads to an exhaust blower 46 (FIGURE 1). The fan pulls the exhaust gas from the sand drum and also induces a flow of fresh air inwardly through both drums, as indicated by the arrows in FIGURE 5. The induced air current carries with it free water vapors which are driven from the sand and gravel.

As best shown in FIGURES 2-6, the sand heating drum 1 and heat exchange drum 2 are each provided with pairs of circular bands 47 which track upon one another. The bands 47 of the heat exchange drum 2 are cradled between pairs of rollers 48—48 (FIGURE 6) which stabilize the drum 2 axially while the bands 47 of the sand heating drum are also cradled between pairs of rollers 48 (FIGURE 6), which sustain the sand heating drum 1 laterally with its bands in tracking engagement with the bands of the heat exchange drum. The respective pairs of stabilized rollers are journalled in brackets 50 (FIGURE 6). The brackets 50 for the respective pairs of rollers are secured to the horizontal beams 51 (FIGURE 3) which form a part of a structural steel framework including vertical members 52 and diagonal braces 53.

The sand heating drum 1 and the heat exchange drum 2 are rotated in the direction indicated by the arrows in FIGURES 3 and 6 by a motor 54 (FIGURES 2 and 5) having a pinion 55 meshing with a ring gear 56 encircling the heat exchange drum 2. The ring gear 56 meshes with a second ring gear 57 encircling the sand heating drum 1. Accordingly, the two drums are rotated in opposite directions as indicated by the arrows in FIGURES 3 and 6.

It will be understood that during the dehydration of the sand and gravel, the sand heating drum 1 and heat exchange drum 2 are rotated continuously by the motor 54 while streams of sand and gravel are fed continuously through the rotating drums by the sand elevator 24 and gravel elevator 34. The rotating drums 1 and 2 thereby create a continuous stream of dehydrated sand and gravel at respective rates of flow which are proportioned, at least generally, to the respective quantities of sand and gravel subsequently metered by the adjustable gates 18 and 20 to the requirements of the pre-mixed concrete which is being produced.

*Cement feeding apparatus*

Figure 4:
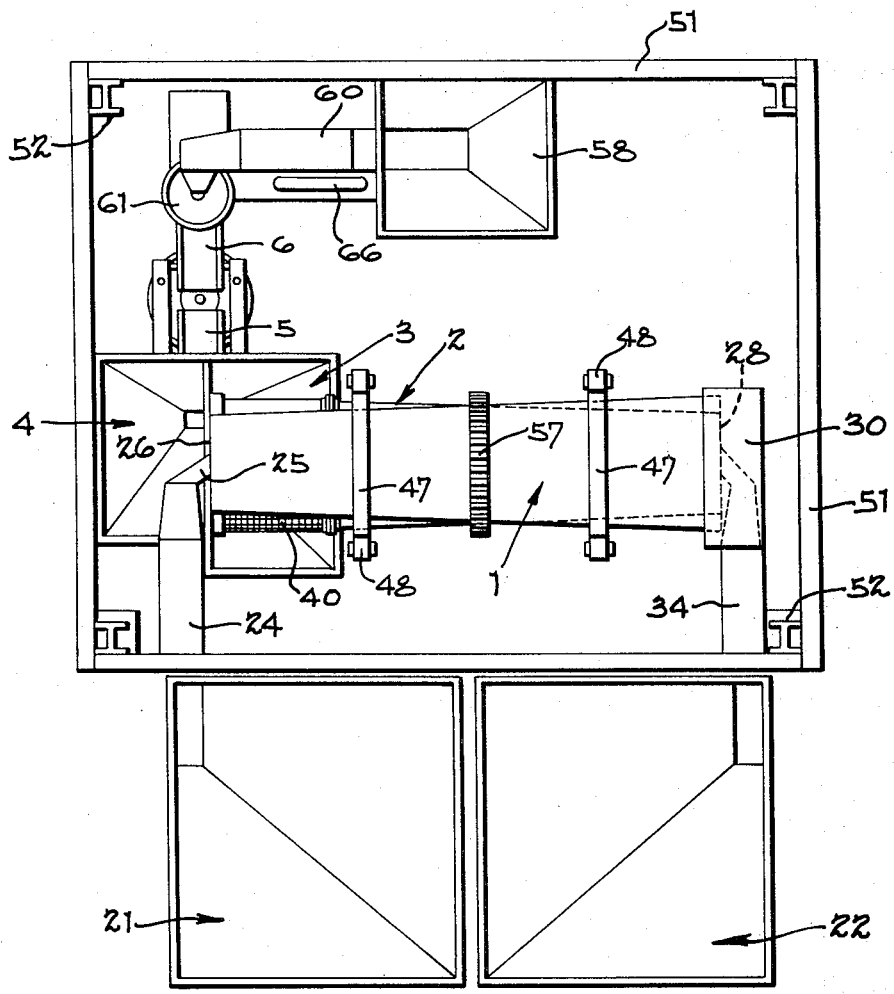
FIGURE 4 is a top plan view of the packaging plant as viewed along the line 4—4 of FIGURE 2.

During the weighing cycle, the Portland cement 41 is first fed into the upper section 8 of the blending apparatus A, as indicated in FIGURE 10. The quantities of the cement 41 is determined by the weighing apparatus 7, the cement is fed into the upper section 8 by means of the vibratory feeder 6 in advance of the batch of sand and gravel. As noted, the operation of the cement feeder 6 is regulated by the weighing apparatus 7 in order to provide more precise weighing and also to provide a more thorough blending action. This arrangement also provides an improved mixing action since the heavier particles of sand and gravel penetrate the loose mass of cement in the receiving cone 11 as they drop from the feeder 5 into the mass of cement in the hopper. The pulverized cement also acts as a lubricant between the sand and gravel particles and the surface of the receiving cone 11 and discharge cone 12 during the mixing and dumping operation, thereby to provide complete discharge of the materials during the blending operation. The dry cement is advanced to the vibratory cement feeder 6 from a cement hopper 58 (FIGURES 1, 3 and 4) which feeds the cement to the cement elevators 60 which elevates the cement to a surge hopper 61 (FIGURES 1, 3 and 4). The vibratory cement feeder 6 communicates with surge hopper 61 so as to feed the cement from surge hopper 61 into the upper section 8 of the blending apparatus A. The vibrating cement feeder 6 is also adjustable in order to control the rate at which the cement is fed into the blending apparatus during the weighing cycle. As noted earlier, the weighing apparatus 7 shuts down the cement feeder 6 when the predetermined quantity of cement is fed into the blending apparatus A. After the cement feeder 6 is decommissioned, the sand and gravel feeder 5 is energized by the control system so as to advance proportionate streams of sand and gravel to the upper section 8, which operation continues until the predetermined quantity by weight, of sand and gravel is advanced to the blending apparatus. At this point the sand and gravel feeder is decommissioned and the blending apparatus is ready for bagging operation.

*Weighing apparatus.—(Heat exchange apparatus of FIGURES 1–12)*

As best shown in FIGURE 3 the upper section 8 of the blending apparatus is suspended from the weighing mechanism 7 by means of the links 62 from a scale beam 63. The scale beam is pivotally connected to the frame of the apparatus as at 64. The scale beam includes a link 65 connected to a weighing scale 66. The scale 66 includes a suitable electrical switches (not shown) which are interconnected with the vibratory sand and gravel feeder 5 and with the cement feeder 6. As noted earlier, the switches of the scale 66 de-energize the feeders 5 and 6 in response to the weight load in section 8 of the blending apparatus, that is, both feeders are decommissioned when the proper quantities of sand, gravel and cement (by weight) are fed into the upper section 8 of the blending apparatus A.

In order to reduce friction to a minimum for sensitive operation, the links 62 which suspend the floating upper section 8, are connected to the ends of bell crank levers 67, the apex of the bell cranks forming fulcrums pivotally mounted with reference to the structural steel framework. One end of each bell crank lever 67 is pivotally connected to one of the links 62 which suspend the upper section 8 of the blending apparatus. The opposite end of each bell crank lever is pivoted to respective toggle levers 68 which have their inner ends linked together as at 70. The inner end of one of the toggle levers 68 is linked as at 71 to the end of the scale beam 63.

As the ingredients are fed into the upper section 8 by successive operation of the feeders 5 and 6, the weight load of the ingredients tends to pull the toggle levers 68 outwardly from one another by operation of the bell crank levers 67. This outward motion of the toggle levers results in a downward toggle force acting through the link 71 to the scale beam 63 to impart an upward pulling force upon the link 65, as indicated by the arrow, thus actuating the scale 66 and causing operation of the switches which are controlled by the scale 66 to regulate the operation of the sand and gravel feeder 5 and the cement feeder 6.

As explained in detail later, the blending sections 8, 13 and 14 of the blending apparatus thoroughly intermix the sand, gravel and cement during the blending and bagging operation by the sequential action of the respective discharge control cones 12. The actual bagging operation is initiated by the operator after the weighing cycle is completed, the blended batch being discharged from the lower section 14 directly into the bag 10. Thus, the operator slips the opened bag 10 upon the discharge spout of the blending apparatus A with the bag resting upon the conveyor 15 after which a dumping switch is operated. The dumping switch preferably is controlled by a treadle, the control system being so arranged that the dumping operation initiates the last weighing and blending cycle such that the partially blended batch of material contained in section 13 is delivered to the lower section 14 while a new batch is being delivered to the upper section 8 by the feeders 5 and 6.

Figure 9:
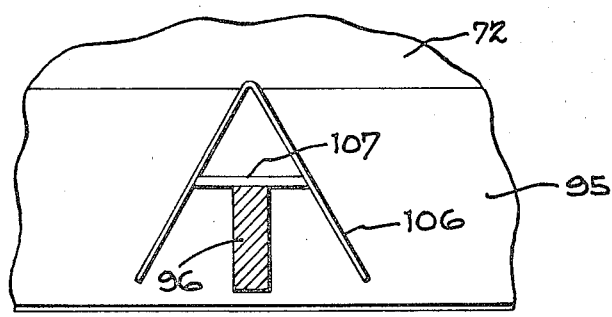
FIGURE 9 is a sectional view taken along the line 9—9 of FIGURE 8, further detailing one of the blending units.

After the bag 10 is loaded as shown in FIGURE 9, the operator causes the bag to be advanced by the conveyor 15 to a stitching machine (not shown) which seals the open upper end of the bag. Thereafter, the bag is removed for storage or transportation.

It will be understood that the dehydrating mechanism operates continuously, while the blending and bagging operations are carried out intermittently under manual control. Accordingly, the compartments 3 and 4 of the surge hopper serve to accommodate an accumulation of dehydrated sand and gravel if the bagging operation is interrupted temporarily. The cement surge hopper 61 likewise provides temporary storage of dry cement which is fed continuously by the cement elevator 60 to the cement hopper 58.

*Blending apparatus.—(FIGURES 1–3 and 7–13)*

The blending apparatuses A and B are similar, with minor exceptions, each comprising the three sections 8, 13 and 14. It will be understood that each of the sections 8, 13 and 14 comprises a self-contained unit, as described below. The following description, which is directed particularly to the apparatus A also applies to the apparatus B, the exceptions being noted later.

In detail (FIGURE 7), the upper section 8 which is suspended from the weighing apparatus by the links 62 comprises a cylindrical chamber 72 having a top flange 73 and enclosing the components of the section 8. The links 62 preferably are arranged in pairs at opposite sides of the chamber 72, each link being anchored to the top flange 73 by means of a bracket element 74 preferably formed of channel iron and welded to the top flange 73.

The receiving cone 11 is in the form of an inverted frustum formed of sheet metal with its upper edge preferably secured to the upper edge of the chamber 72 by welding as at 75. The lower end portion of the receiver cone 11 is removed to delineate a discharge opening 76, the opening 76 being shown with respect to the intermediate section 13 of FIGURE 7. The discharge opening 76 is normally closed by the discharge control cone 12.

The discharge cone 12 is in the form of an upright frustum, its upper end portion being removed to receive a top wall 77, the wall preferably being welded to the upper edge of the opening as at 78. The discharge control cone is provided with a series of outwardly projecting rods 80 which are preferably welded as at 81 to the surface of the cone 12. These rods aid in dispersing the cement, sand and gravel as they are fed into the receiver cone and also as the mixture is discharged.

In order to prevent sifting of the fine cement particles through the open end of the receiver cone 11, the lower edge of the control cone 12 is provided with a gasket 82, which seats about the periphery of the discharge opening 76 of the receiver cone. The gasket may be formed of rubber, synthetic rubber or a resilient plastic material suitable to form a seal. The control cones 12 of the intermediate section 13 and lower section 13 are provided with similar gaskets 82 to prevent sifting of cement particles and thereby to assure uniformity in blending the mixture.

In order to mount the gasket 82, the lower edge of the control cone 12 is provided with an internal flange 83 in the form of a ring which is preferably welded to the internal periphery of the control cone 12. The internal flange 83 forms a seat for the gasket 82 which is also in the form of a ring having an outside diameter slightly larger than the outside diameter at the lower end of the control cone 12. The outside diameter of the gasket is tapered as at 84 on an angle corresponding to the angle of the receiver cone 11.

The gasket 82 is clamped in place beneath its mounting flange 83 by a clamping ring 85 which seats against its lower surface. A series of bolts 86 pass upwardly through the clamping ring 85, through the gasket 82 and through the mounting flange 83. Each bolt 86 includes a nut 87 seated against the upper surface of the mounting flange 83, such that the gasket 82 is firmly clamped between the flange 83 and clamping ring 85.

Each discharge cone 12 of the sections 8, 13 and 14 is shifted from its closed position (upper section 8—FIGURE 7) to its open discharge position (intermediate section 13) by a respective air cylinder 88. Each air cylinder 88 includes a piston (not shown) and a piston rod 90 projecting from its upper end and through the top wall 77 of the cone 12. The piston rod 90 is clamped to the top wall 77 by means of nuts 91 threaded on the piston rod and in clamping engagement with the opposite sides of the wall 77. Air pressure is supplied to the air cylinder by pairs of flexible conduits 92 and 93 which communicate with the opposite ends of the air cylinder 88. The flexible conduits 92 and 93 pass outwardly through the wall of the cylindrical chamber 72, and each pair of conduits is connected to a valve (not shown) to supply and exhaust air pressure alternately with respect to the two conduits.

Thus, in order to elevate the discharge control cone 12 (intermediate section 13 of FIGURE 7) air pressure is supplied to the lower conduit 93 to force the piston and piston rod 90 upwardly, as indicated by the arrow, while air is exhausted from above the piston by way of the conduit 92. In order to lower the cone 12 to the position shown with reference to the upper section 8 in FIGURE 7, air pressure is admitted to the upper end of the cylinder 88 by way of the upper conduit 92 and exhausted by way of the lower conduit 93. This operation is regulated by the control system (not shown).

Figure 7:
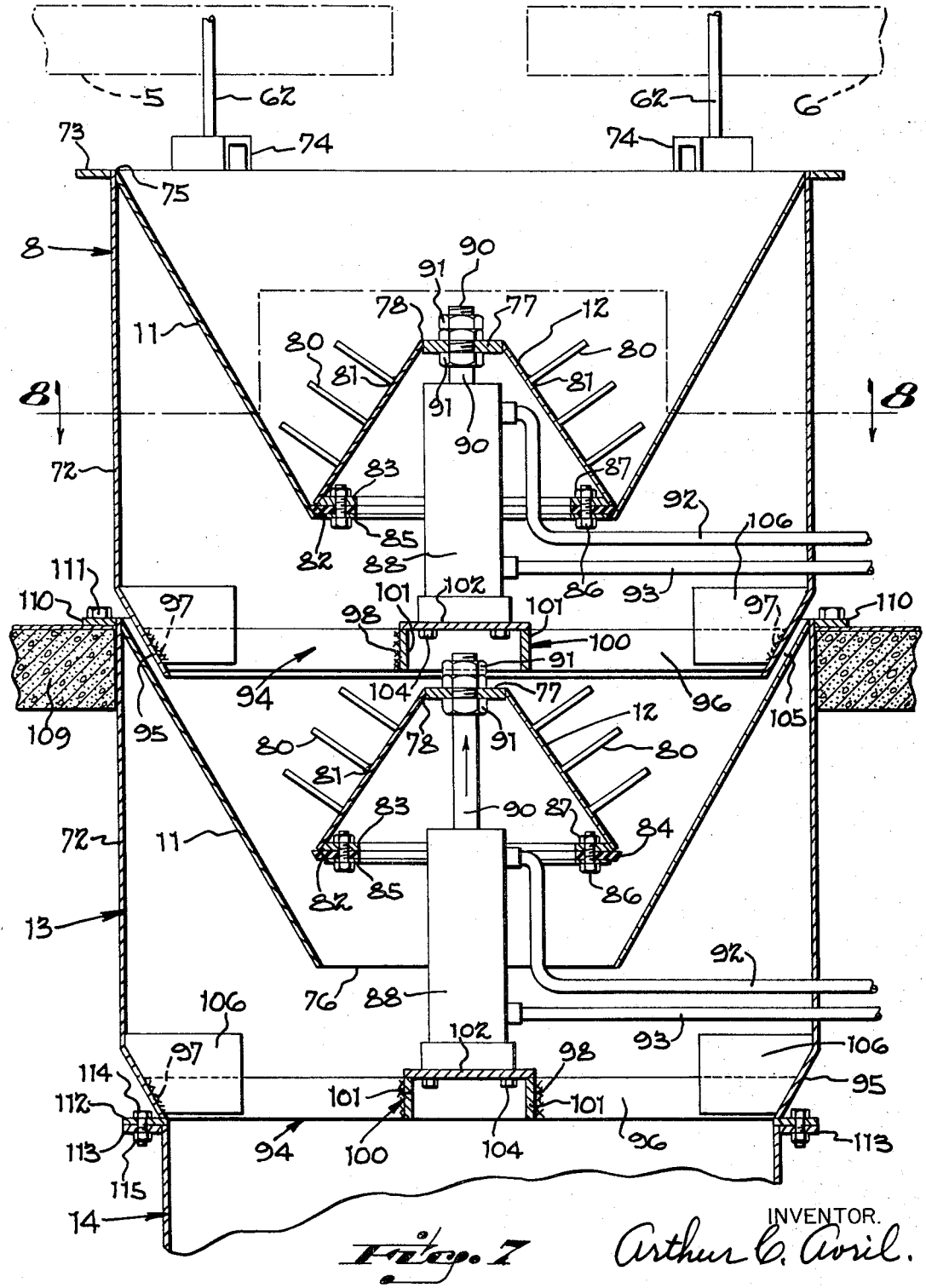
FIGURE 7 is an enlarged fragmentary longitudinal sectional view taken from FIGURE 3, detailing the upper portion of the blending apparatus shown in FIGURES 1, 2 and 3 in which the upper blending unit is suspended from the weighing apparatus.
Figure 8:
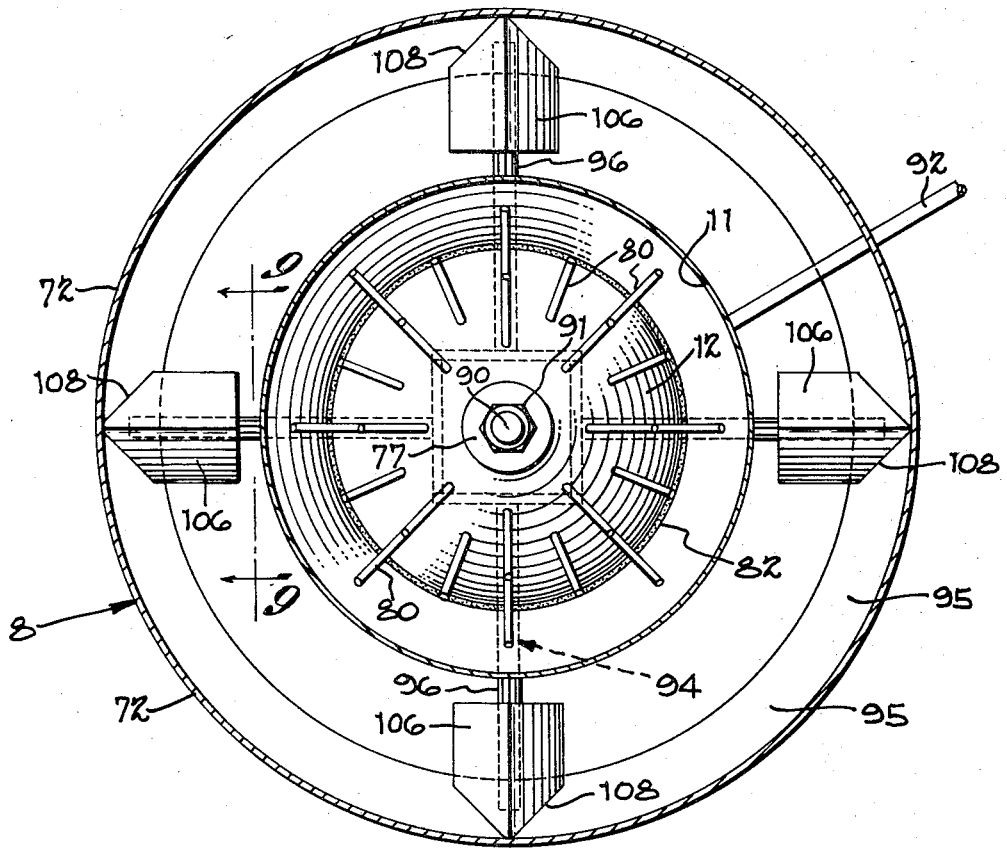
FIGURE 8 is a sectional view taken along line 8—8 of FIGURE 7, further detailing the blending apparatus of FIGURE 7.

As best shown in FIGURES 7, 8 and 9, each air cylinder 88 has its lower end supported upon a spider indicated generally at 94, which is mounted in the lower tapered end portion 95 of the cylindrical chamber 72. Each spider comprises a set of four radially arranged bars 96 having their outer ends welded as at 97 to the tapered end portion 95 of the chamber 72. The inner end of each bar 96 is secured preferably by welding as at 98 to a central box-like frame indicated generally at 100.

The box-like frame 100 comprises respective side pieces 101 arranged in the form of a square, the four corners preferably being welded together. The frame 100 also includes a top plate 102, preferably welded to the upper surface of frame 100 (FIGURE 7).

The above described spider arrangement is in duplicate for the three blender sections 8, 13 and 14. However, it will be noted in FIGURE 13 that the lower section 14 is slightly smaller in diameter than the sections 8 and 13 and does not include the tapered lower end portion 95; hence the outer ends of the radial bars 96 of the spider 94 are welded as at 103 directly to the cylinder wall of the lower section 14.

Referring back to FIGURE 7, it will be noted that in each case the air cylinder 88 has its lower end seated directly upon the top plate 102 of the frame 100 which forms a part of spider 94. The cylinder is secured in place on the spider by means of bolts 104 passing upwardly through the top plate 102 into the lower end of cylinder 88. The downward force which is developed when the discharge control cone 12 is elevated, is thus transmitted through the cylinder 88 to the spider 94. Since in each case, the spider 94 forms a part of the chamber 72, each section 8, 13 and 14, comprising the receiver cone 11, the discharge control cone 12, and the actuating cylinder 88 each comprise a self-contained unit.

In the form of the invention disclosed in FIGURES 3 and 7, the upper blender section 8 acts as a weighing hopper, being suspended by the scale links 62, as noted earlier. For this purpose (FIGURE 7) the tapered lower end 95 of chamber 72 is suspended slightly above the receiver cone 11 of the intermediate section 13 to permit the weighing operation, the clearance being indicated at 105. It will be noted in FIGURE 7 that the tapered lower end portion 95 of chamber 72 (upper section 8) has substantially the same degree of taper as the receiver cone 11 of the section 13. It will be understood that the conduits 92 and 93, being formed of flexible material do not interfere with the vertical motion of the upper blender section 8 during the weighing operation and that the weighing apparatus is adjusted to compensate for the weight of the self-contained section 8 and weight of the air cylinder and air conduits.

As viewed in FIGURES 7, 8, 9 and 13, each radial bar 96 of the spider 94 is provided with a shield 106 of angle formation with its apex projecting upwardly. The shield is secured to the spider bar 96 by a cross piece 107 which is welded to the shield 106 and to the bar 96. The outer end of each shield 106 is cut to form angular edges 108 which seat against the surface of the tapered end portion 95 of the chamber 72 (blender sections 8 and 12). The angular edges 108 (FIGURE 8) are preferably welded to the surface of the tapered end portion 95.

The shields prevent the accumulation of cement upon the upper surface of the spider bars 96, since the inclination of the opposite sides of the shield is sufficient to overcome the tendency of the pulverized cement to adhere. The shields 106 also strengthen the connection between the spider bars 96 and the tapered end portion 95 of the cylindrical chamber 72.

The intermediate blender section 13 and lower blender section 14 are rigidly suspended as a unit from the floor 109 of the packaging plant, as shown in FIGURES 7 and 13. It will be understood at this point that the blender B shown in FIGURE 13 represents a modified arrangement in which the cement, sand and gravel are weighed in scale hoppers suspended above the blender, as described later. However, the blender sections 13 and 14 are identical to those disclosed in FIGURE 7.

Described in detail (FIGURES 7 and 13), the intermediate blender section 13 includes a top flange 110 resting upon the floor 109 and secured thereto by a series of bolts 111. The lower end of intermediate section 13 (chamber 72) includes a bottom flange 112 for mounting the lower blender section 14. For this purpose, the upper edge of the blender section 14 also includes a top flange 113 mating with the bottom flange 112. The two flanges 112 and 113 are rigidly secured together by a series of bolts 114 having nuts 115. The intermediate section 13 and lower section 14 thus form a rigid unit suspended from the floor of the plant.

It will be understood at this point, that in the several forms of the invention, the heat exchange apparatus and the weighing mechanism are both mounted above the floor 109 of the plant, while the intermediate and lower blending sections 13 and 14 depend downwardly from the floor and lead to a tapered collector chute 116 (FIGURE 13). The collector chute 116 is generally funnel-shaped and includes a spout 117 at its lower end arranged to receive the open end of the bag 10, as shown in FIGURE 3.

In order to secure the collector chute 116, the adjoining edges of the lower blender section 14 and collector chute 116 include mating flanges 118 secured together by bolts 120. It will be noted in FIGURE 13 that the box-like frame 100 of spider 94, in the lower blender section, is reversed in relation to the upper two spiders. The purpose of this arrangement is to provide clearance for the lower air cylinder 88, the lower end of which seats within the frame 100. The lower end of the cylinder is secured by bolts 104 (FIGURE 7) to the frame 100 as previously described.

Within the collector chute, (FIGURE 13) there is mounted a cone-shaped deflector 121. The deflector is secured in place upon a stud 122 projecting downwardly from the frame 100, with the deflector secured by nuts 123 threaded on the stud. As the blended concrete mixture is discharged from the receiver cone 11 of the lower section 14, the flow streams of material impinge against the upper surface of the deflector 121, then pass outwardly to impinge upon the internal surface of the collector chute 116. The flow of the material is indicated by the arrows in FIGURE 13. After flowing it through chute 116, the material drops by gravity through the spout 117 and directly into the bag 10.

In order to control the dust which flows upwardly from the open end of the bag as it is loaded, the lower portion of the collector chute 116 includes a cylindrical dust collector or shroud 124 (FIGURES 3 and 13). The shroud is of sheet metal construction and its upper wall 125 embraces the collector chute and is welded thereto. In order to carry off the dust particles, the shroud 124 includes a suction duct 126 which is connected to a suitable suction pump (not shown).

Modified packaging plant

As noted above, the blender B of FIGURE 13 is identical to the blender A except that the upper section 8 is mounted in a fixed position instead of being suspended from the weighing mechanism. Thus, as shown in FIGURE 13, the upper section 8 is mounted rigidly upon the floor 109 by means of a flange 127 in the form of a ring projecting from the tapered end portion 95 (chamber 72) of blender section 8 and secured to the floor 109. The cement, sand and gravel are fed into the fixed blender section 8 by means of the two scale hoppers indicated generally at 128 and 130 which are suspended from a pair of scale beams forming a part of a modified weighing apparatus indicated generally at 131. The scale hopper arrangement is similar to that disclosed in prior Avril Patent No. 2,530,501, issued on November 21, 1950.

Generally speaking, the dehydrated sand, indicated at 132 (FIGURE 13) is fed into the scale hopper 130 and the dehydrated gravel 133 is charged into the hopper above the sand. The dry Portland cement 134 is charged separately into the cement hopper 128. The two hoppers 128 and 130 are suspended from respective scale beams 135 and 136 which are interconnected with a control system (not shown). The control system regulates the operation of two vibratory feeders, the sand feeder being indicated at 137 in broken lines. A gravel feeder (not shown) extends parallel with the sand feeder from the opposite side of hopper 130 and is arranged to feed the gravel 133 into the hopper 130 after the sand is fed in. The vibratory feeder 138 feeds in the predetermined quantity of the dry Portland cement into the hopper 128.

When the predetermined quantity (by weight) of sand 132, gravel 133 (hopper 130) and the predetermined quantity of cement 134 (hopper 128) has been fed, the three feeders are shut down by the control system in response to the three individual weight loads of sand, gravel and cement. The ingredients are then discharged from the scale hopper 130 into the fixed blending section 8 to be blended and discharged into the bag. This arrangement thus makes it possible to convert prior packaging plants (Avril Patent No. 2,530,501) to the improved blending apparatus. As noted earlier, the weighing and discharge cycles are regulated by the operator as the successive bags 10 are placed in position upon the spout 117 to receive the blended ingredients.

For dumping purposes (FIGURE 13), each scale hopper 128 and 130 is provided with an air-operated door 140 mounted in the lower portion of the hopper and hinged thereto as at 141. Each door 140 is actuated by a cylinder 142, in the present example, an air cylinder having conduits 143—143 for supplying and exhausting air from opposite ends of the cylinders, thereby to open and close the door. Each air cylinder 142 is pivotally connected as at 144 to an angle iron framework 145. The framework 145 of each hopper is of welded construction and is secured to the wall of the hopper above the door opening. Each cylinder 142 includes a piston having a piston rod 146, the lower end of which is pivotally connected to the door as at 147.

When the dumping switch is actuated for the bagging operation, air pressure is applied to the lower ends of both cylinders 142 by way of the lower conduits 143, thus pulling both doors 140 concurrently to the open position. During this operation, the air is exhausted from the upper ends of the cylinders by way of the upper conduits 143. When the doors 140 are thus swung to the open position, the contents of both scale hoppers 128 and 130 flow by gravity from the open lower end portion of the hoppers into the receiver cone 11 of the upper blender section 8. The materials flow generally in the direction indicated by the arrows 148 in FIGURE 13 and impinge upon the discharge control cone 12, whereby the discharge cone provides a preliminary mixing action.

After the contents of both hoppers are discharged to the blender section 8, the doors are closed by applying air pressure by way of the upper conduits 143, while exhausting the air pressure by way of the lower conduits. After the doors are closed, the air pressure is sustained against the upper end of the piston by way of the upper conduits so as to hold the doors forcibly in closed position. This prevents the weight load of the materials, which are subsequently fed into the hoppers, from forcing the doors open, such that the material is positively confined in the hoppers until the doors 140 are again opened after the next successive weighing cycle.

Operation of blender

The operation of the blending unit is shown diagrammatically in FIGURES 10, 11 and 12. These views represent the blending apparatus A which is illustrated in FIGURES 1–3, 7 and 8 and also the blending apparatus B, which is illustrated in FIGURE 13.

It will be understood that the three stage blending apparatus provides more rapid packaging and more thorough blending because, during each packaging operation, two batches of ingredients are progressing through the blender while a third batch is being fed into the upper section 8 of the blender. In other words, the third batch is being fed into the section 8 either by the feeders 5 and 6, as indicated in the diagrams or by the scale hoppers 128 and 132 of the blending apparatus B (FIGURE 13).

The sequential operations described below are carried out automatically each time the weighing and bagging cycles are initiated by the operator.

As shown in FIGURE 10, a first batch of blended material indicated at C, is shown discharged into the bag 10 at the conclusion of a bagging operation, batch C having been discharged from the lower blending section 14, as indicated by the arrows in FIGURE 10. The discharge control cone 12 of section 14 is shown in its raised discharge position in FIGURE 10.

At about the time the batch C is discharged into the bag, a batch D (FIGURE 10) is confined in the intermediate blender section 13 having been previously delivered from the upper section 11. Concurrently, a third batch E is being delivered to the upper section E which comprises the weighing hopper in the instance of the blending apparatus A.

After the batch C is delivered to the bag (FIGURE 10), the charging cone 12 of the lower section 14 is shifted to its closed position (FIGURE 11), then the discharge cone 12 of the intermediate section 13 is elevated, thus delivering the batch D from the intermediate section 13 to the lower section 14. At about the same time, the third batch E has been weighed into the upper section 8, causing the feeders 5 and 6 to be deenergized.

After batch D has been delivered to section 14, the discharge control cone 12 of the upper section 8 is shifted to its elevated position, causing the batch E to be discharged to its elevated position, causing the batch E to be discharged into the intermediate section 13 (FIGURE 12). Thereafter, the control cone 12 of the upper section 8 shifts to its closed position, so as to condition the upper section 8 to receive the next batch of material from the feeders 5 and 6.

Briefly therefore, during the bagging operation, the discharge cone 12 of each section is opened and closed in sequence and in an automatic manner, starting with the lower section 14 and progressing upwardly. Thus, when the dumping switch is actuated, the cone 12 of the lower section 14 is raised for a period sufficient to allow its batch C to be discharged into the bag and is then shifted to its closed position (FIGURE 10). Immediately thereafter, the cone 12 of the intermediate section 13 is elevated (FIGURE 11) to permit the batch D to discharge to the lower section 14, then the cone 12 of intermediate section closes. Thereafter, the cone 12 of the upper section 8 shifts to its elevated position to discharge the new batch E from the upper section 8 to the intermediate section 13 (FIGURE 12). After the cone of the upper section 8 returns to its closed position, the apparatus is ready for the next bagging cycle, at which time the feeders 5 and 6 are reactivated.

The actuation of the three discharge control cones 12 is regulated in an automatic manner by a control system (not shown), as noted earlier. In general, the control system comprises an electrical circuit, combined with an air pressure and exhaust system having electrically operated valves arranged to apply pressure and vacuum to the three cylinders 88 in proper sequence. The control system for the blending apparatuses A and B is the same, and the sequence of operation is similar.

The weighing apparatus (in apparatuses A and B) is automatic and after the first or weight switch is closed, the weighing apparatus indicates to the operator by means of a signal light that the ingredients in proper proportion have been charged into the apparatus (either the upper section 8 of apparatus A or the scale hoppers of apparatus B). At this point the operator initiates the dumping cycle by closing the second switch, causing the electrical circuit to actuate the three air cylinders 8 in proper sequence, as described above, to carry out the bagging cycle. The apparatus then remains inactive until the operator again initiates a cycle by operation of the start switch to energize the feeding and weighing apparatus.

As noted earlier, air pressure and a partial vacuum is created during the sequential operation of the blending sections 8, 13 and 14 (FIGURES 10, 11 and 12). Thus, as the lower section 14 discharges (FIGURE 10) a partial vacuum is developed in the section 13, which discharges immediately following the discharge of section 14, thereby to assist in the flow of material from section 13 to section 14 (FIGURE 11). At or about the same time, the upper section 8 discharges into the intermediate section 13, thereby creating air pressure which further accelerates the flow of materials from section 13 to section 14.

Having described my invention, I claim:

1. An apparatus for blending dry granulated materials comprising:
    an inverted receiver cone having an open top and having a circular discharge opening at the lower end portion thereof which has a diameter equal to at least one-third the diameter of the open top of the receiver cone;
    an upright discharge control cone disposed within the lower portion of the receiver cone and adapted to be shifted from a lowered charging position to an elevated discharge position;
    said discharge control cone having a base which is substantially equal in diameter to the diameter of the circular discharge opening of the inverted receiver cone and being adapted to engage the surface of the inverted receiver cone about the periphery of said discharge opening when said discharge control cone and receiver cone are in said charging position, thereby to confine a mass of said dry granulated materials in the lower portion of the receiver cone above said discharge opening;
    and means for shifting said discharge control cone and receiver cone relative to one another to said discharge position with the base of the upright discharge control cone spaced from the peripheral surface of the inverted receiver cone;
    whereby the mass of dry granulated materials confined in the receiver cone is adapted to cascade by gravity from the discharge opening of the receiver cone in the form of a circular flow stream.

2. An apparatus for blending dry granulated materials comprising:
    an inverted receiver cone having an open top and having a circular discharge opening at the lower end portion thereof which has a diameter equal to at least one-third the diameter of the open top of the receiver cone;
    an upright discharge control cone disposed within the lower portion of the receiver cone;
    said discharge control cone and receiver cone adapted to be shifted relative to one another from a charging position to a discharge position;
    said discharge control cone having a base which is substantially equal in diameter to the diameter of the cylindrical discharge opening of the inverted receiver cone and being adapted to engage the surface of the inverted receiver cone about the periphery of said discharge opening when said discharge control cone and receiver cone are in said charging position, thereby to confine a mass of said dry granulated materials in the lower portion of the receiver cone above said discharge opening;
    and reversible power means for shifting said discharge control cone and receiver cone relative to one another to said discharge position, with the base of the upright discharge control cone spaced from the peripheral surface of the inverted receiver cone; whereby the mass of dry granulated materials confined in the receiver cone is adapted to cascade by gravity from the discharge opening of the receiver cone;
    said reversible power means adapted to shift the discharge control cone and receiver cone relative to one another to said charging position after said mass of dry granulated materials has been discharged from the receiver cone in the form of a circular flow stream.

3. An apparatus for blending dry granulated materials comprising:
    An inverted receiver cone having an open top and having a circular discharge opening at the lower end thereof which has a diameter equal to or greater than one-third the diameter of the open top of the receiver cone;
    an upright discharge control cone disposed within the lower portion of the receiver cone and adapted to be shifted from a lowered charging position to an elevated discharge position;
    said discharge cone having a base which is substantially equal in diameter to the diameter of the cylindrical discharge opening of the inverted receiver cone and being adapted to seat against the internal surface of the inverted receiver cone about the periphery of said discharge opening when in said lowered charging position, thereby to confine the mass of said dry granulated materials in the receiver cone above said discharge opening;
    and a reversible power device connected to the discharge control cone and adapted to shift said discharge control cone from said lowered charging position to said elevated discharge position with the base of the discharge cone spaced above the peripheral surface of the inverted receiver cone and thereby providing an annular discharge passageway about the base of the discharge control cone and internal surface of the receiver cone;
    said annular passageway adapting the mass of dry granulated materials to cascade through said annular passageway in the form of a circular flow stream from said discharge opening.

4. An apparatus for blending dry granulated materials comprising:
    an inverted receiver cone having an open top and having a cylindrical discharge opening at the lower end portion thereof which has a diameter greater than one-third the diameter of the open top of the receiver cone;

means for feeding dry granulated materials into said inverted receiver cone;

an upright discharge control cone disposed within the lower portion of the receiver cone and adapted to be shifted from a lowered charging position to an elevated discharge position; a plurality of rod elements projecting outwardly from the surface of the discharge control cone, said rod elements adapted to intercept and disperse the dry granulated materials as the materials are fed into the inverted receiving cone;

said discharge cone having a circular base which is substantially equal in diameter to the diameter of the cylindrical discharge opening of the inverted receiving cone and adapted to engage the circular internal surface of the inverted receiver cone above said discharge opening when in said lowered charging position thereby to confine the mass of said dry granulated materials in the receiver cone above said discharge opening;

and means connected to the discharge control cone for shifting said discharge control cone from said lowered charging position to said elevated discharge position with the base of the discharge cone spaced above the surface of the inverted receiver cone and providing an annular discharge passageway about the base of the discharge control cone and surface of the receiver cone;

said annular passageway adapting the mass of dry granulated materials to cascade through said annular passageway in the form of a circular flow stream from said discharge opening.

5. An apparatus for blending dry granulated material comprising:

a plurality of blending units disposed one above the other;

each of said blending units comprising an inverted receiver cone having an open top and having a cylindrical discharge opening at the lower end portion thereof which has a diameter less than one-half the diameter of the open top of the receiver cone;

an upright discharge control cone disposed within the lower portion of the receiver cone and adapted to be shifted from a lowered charging position to an elevated discharge position;

means for feeding a mass of dry granulated material into the receiver cone of the upper of said plurality of blending units;

each of said discharge control cones having a base which is substantially equal in diameter to the diameter of the cylindrical discharge opening of the inverted receiver cone and being adapted to seat against the internal surface of the inverted receiving cone in which it is disposed when in said lowered charging position, whereby each discharge cone is adapted to confine a mass of dry granulated material in the receiver cone above the discharge opening;

and respective power means connected to the discharge control cone of each blending unit;

said respective power means arranged to shift the discharge control cones of the respective blending units successively to said elevated discharge position, thereby to deliver a given mass of dry granulated material from the uppermost blending unit and successively through said plurality of blending units, and whereby said given batch of dry granulated material is successively blended during passage through said blending apparatus for discharge from the lowermost blending unit of said plurality.

6. The method of blending separate metered quantities of at least two different dry particulate materials, each of which is characterized as having a particle weight and fineness range different from the other, said method comprising:

providing at least two receiver elements, one above the other, and enclosing the same in a housing;

placing said separate metered quantities of materials in the upper receiver element and confining said separate metered quantities of materials temporarily in said upper receiver element;

discharging said separate metered quantities of materials by gravity from said upper receiver element in the form of a flow stream;

providing air pressure in said upper receiver element and a partial vacuum in the lower receiver element to assist in the flow of materials from the upper to the lower receiver element;

deflecting the said flow stream to at least partially blend said materials as the flow stream falls by gravity from said upper receiver element;

stopping and temporarily confining said flow stream of partially blended materials in the lower receiver element;

discharging said partially blended metered quantities of materials by gravity from said lower receiver element in the form of a second flow stream;

and collecting said materials after the second flow stream issues from the second receiver element.

7. An apparatus for blending dry granulated materials comprising:

an inverted receiver cone having a discharge opening at the lower end thereof;

an upright discharge control cone disposed within the lower portion of the receiver cone and adapted to be shifted from a lowered charging position to an elevated discharge position;

said discharge cone having a base including a circumferential gasket adapted to seat against the internal surface of the inverted receiver cone above said discharge opening when said discharge control cone is in said lowered charging position, thereby to provide a seal against leakage of fine particles from the mass of dry granulated materials confined in the receiver cone;

a chamber enclosing said inverted receiver cone;

a support element mounted in the lower portion of said chamber;

an air cylinder having its lower end seated upon said support element and adapted to shift the discharge control cone from said lowered position to an elevated discharge position, thereby providing an elevated or annular discharge passageway about the base of the discharge control cone;

said air cylinder having a piston rod projecting from the upper end thereof and connected to the upper portion of the discharge control cone, with a portion of the air cylinder projected into the discharge control cone when the cone is in the lowered charging position, thereby to conserve space, said passageway adapting the mass of dry granulated materials to cascade through said passageway when the discharge cone is shifted to the elevated discharge position.

8. An apparatus for blending dry graulated materials comprising:

an inverted receiver cone having a discharge opening at the lower end portion thereof;

an upright discharge control cone disposed within the lower portion of the receiver cone and adapted to be shifted from a lowered charging position to an elevated discharge position;

said discharge cone having a base adapted to seat against the internal surface of the inverted receiver cone above said discharge opening when said discharge control cone and receiver cone are in said lowered charging position, thereby to provide a seal against leakage of fine particles from the mass of dry granulated materials confined in the receiver cone;

a chamber enclosing said inverted receiver cone;

a support element comprising a spider mounted in the lower portion of said chamber and having a plurality of radially arranged bar elements joined to the chamber and having inner ends joined together;

an air cylinder having its lower end seated upon said spider and adapted to shift the discharge control cone from said lowered position to an elevated discharge position, thereby providing an annular discharge passageway about the base of the discharge control cone;

said air cylinder having a piston rod projecting from the upper end thereof and connected to the upper portion of the discharge control cone, with a portion of the air cylinder projected into the discharge control cone when the cone is in the lowered charging position, thereby to conserve space, said passageway adapting the mass of dry granulated materials to cascade through said passageway when the discharge control cone is shifted to the elevated discharge position.

9. An apparatus for blending dry granulated materials comprising:

a plurality of blending units disposed one above the other;

each of said blending units comprising an inverted receiver cone having an inwardly sloping surface and a discharge opening at the lower end portion thereof;

an upright discharge control cone having an outwardly sloping surface disposed within the lower portion of the receiver cone and adapted to be shifted from a lowered charging position to an elevated position;

means for feeding a mass of dry granulated material into the receiver cone of the upper of said plurality of blending units;

each of said discharge control cones having a base adapted to seat against the internal surface of the inverted receiving cone in which it is disposed when in said lowered charging position, whereby each discharge cone is adapted to confine a mass of dry granulated material in the receiver cone above the discharge opening;

and respective power means adapted to shift the discharge control cones of the respective blending units successively to the said elevated discharge position;

the inwardly sloping internal surface of the receiver cone and the outwardly sloping external surface of the discharge control cone below said receiver cone being related to one another at an angle adapting the mass of dry granulated material flowing from the receiver cone to be intercepted by the sloping surface of the discharge control cone, thereby to commingle the particles of the mass as they flow downwardly into the successive inverted receiver cones of the blending units;

the outwardly sloping external surface of said discharge control cones being provided with a plurality of rod elements projecting outwardly and adapted to intercept and disperse the dry granulated materials as the materials flow from the receiver cone toward the sloping surface of the discharge control cone.

10. An apparatus for blending dry granulated materials comprising:

a plurality of blending units disposed one above the other;

each of said blending units comprising an inverted receiver cone having an inwardly sloping surface and a discharge opening at the lower end portion thereof;

an upright discharge control cone having an outwardly sloping surface disposed within the lower portion of the receiver cone and adapted to be shifted from a lowered charging position to an elevated discharge position;

means for feeding a mass of dry granulated material into the receiver cone of the upper of said plurality of blending units;

each of said discharge control cones having a base adapted to seat against the internal surface of the inverted receiving cone in which it is disposed when in said lowered charging position, whereby each discharge cone is adapted to confine a mass of dry granulated material in the receiver cone above the discharge opening;

respective power means adapted to shift the discharge control cones of the respective blending units successively to the said elevated discharge position;

the inwardly sloping internal surface of the receiver cone and the outwardly sloping external surface of the discharge control cone below said receiver cone being related to one another at an angle adapting the mass of dry granulated material flowing from the receiver cone to be intercepted by the sloping surface of the discharge control cone, thereby to commingle the particles of the mass as they flow downwardly into the successive inverted receiver cones of the blending units;

the discharge openings of the inverted receiver cones having a diameter substantially equal to the diameter of the base of the upright receiver cone, thereby to discharge the mass of dry granulated material in the form of a circular flow stream.

11. An apparatus for blending dry granulated materials comprising:

a plurality of blending units disposed one above the other;

each of said blending units comprising an inverted receiver cone having an inwardly sloping surface and a discharge opening at the lower end portion thereof;

an upright discharge control cone having an outwardly sloping surface disposed within the lower portion of the receiver cone and adapted to be shifted from a lowered charging position to an elevated discharge position;

means for feeding a mass of dry granulated material into the receiver cone of the upper of said plurality of blending units;

each of said discharge control cones having a base adapted to seat against the internal surface of the inverted receiving cone in which it is disposed when in said lowered charging position, whereby each discharge cone is adapted to confine a mass of dry granulated material in the receiver cone above the discharge opening;

respective power means adapted to shift the discharge control cones of the respective blending units successively to the said elevated discharge position;

the inwardly sloping internal surface of the receiver cone and the outwardly sloping external surface of the discharge control cone below said receiver cone being related to one another at an angle adapting the mass of dry granulated material flowing from the receiver cone to be intercepted by the sloping surface of the discharge control cone, thereby to commingle the particles of the mass as they flow downwardly into the successive inverted receiver cones of the blending units;

the discharge openings of the inverted receiver cones having a diameter substantially equal to the diameter of the base of the upright receiver cone;

the outwardly sloping external surface of said discharge control cones being provided with a plurality of rod elements projecting outwardly and adapted to intercept and disperse the dry granulated materials as the materials flow from the receiver cone toward the sloping surface of the discharge control cone.

12. An apparatus for blending dry granulated material comprising:
a plurality of blending units disposed one above the other;
each of said blending units comprising an inverted receiver cone having a discharge opening at the lower end portion thereof;
an upright discharge control cone disposed within the lower portion of the receiver cone and adapted to be shifted from a lowered charging position to an elevated discharge position;
means for feeding a mass of dry granulated material into the receiver cone of the upper of said plurality of blending units;
each of said discharge control cones having a base adapted to seat against the internal surface of the inverted receiving cone in which it is disposed when in said lowered charging position, whereby each discharge control cone is adapted to confine a mass of dry granulated material in the receiver cone above the discharge opening;
a weighing apparatus including means suspending the upper blending unit from the weighing apparatus, said weighing apparatus adapted to control the weight load of the dry granulated material which is fed into said upper blending unit;
and respective power means connected to the discharge control cone of each blending unit adapted to shift the discharge control cones of the respective blending units successively to said elevated discharge position.

13. An apparatus for blending dry granulated material comprising:
a plurality of blending units disposed one above the other;
each of said blending units comprising an inverted receiver cone having a discharge opening at the lower end portion thereof;
an upright discharge control cone disposed within the lower portion of the receiver cone and adapted to be shifted from a lowered charging position to an elevated discharge position;
each of said discharge control cones having a base adapted to seat against the internal surface of the inverted receiving cone in which it is disposed when in said lowered charging position, whereby each discharge control cone is adapted to confine a mass of dry granulated material in the receiver cone above the discharge opening;
a weighing apparatus including means suspending the upper blending unit from the weighing apparatus, said weighing apparatus adapted to control the weight load of the dry granulated material which is fed into said upper blending unit;
means for feeding quantities of dry granulated materials into said upper blending unit, said weighing apparatus adapted to decommission said feeding means when a predetermined weight load of dry granulated material has been fed into said upper blending unit;
and respective power means connected to the discharge control cone of each blending unit adapted to shift the discharge control cones of the respective blending units successively to said elevated discharge.

14. An apparatus for blending dry granulated material comprising:
a plurality of blending units disposed one above the other;
each of said blending units comprising an inverted receiver cone having a discharge opening at the lower end portion thereof;
an upright discharge control cone disposed within the lower portion of the receiver cone and adapted to be shifted from a lowered charging position to an elevated discharge position;
each of said discharge control cones having a base adapted to seat against the internal surface of the inverted receiving cone in which it is disposed when in said lowered charging position, whereby each discharge control cone is adapted to confine a mass of dry granulated material in the receiver cone above the discharge opening;
a weighing apparatus including means suspending the upper blending unit from the weighing apparatus, said weighing apparatus adapted to control the weight load of the dry granulated material which is fed into said upper blending unit;
means for feeding quantities of dry granulated materials into said upper blending unit, said weighing apparatus adapted to decommission said feeding means when a predetermined weight load of dry granulated material has been fed into said upper blending unit;
means supporting the lower blending units in fixed position below the upper units;
and respective power means connected to the discharge control cone of each blending unit adapted to shift the discharge control cones of the respective blending units successively to said elevated discharge position.

15. An apparatus for blending dry granulated material comprising:
a plurality of blending units disposed one above the other;
each of said blending units comprising an inverted receiver cone having a discharge opening at the lower portion thereof;
an upright discharge control cone disposed within the lower portion of the receiver cone and adapted to be shifted from a lowered charging position to an elevated discharge position;
means for feeding a mass of dry granulated material into the receiver cone of the upper of said blending units;
each of said discharge control cones having a base adapted to seat against the internal surface of the inverted receiver cone in which it is disposed when in said lowered charging position, whereby each discharge cone is adapted to confine a mass of dry granulated material in the receiver cone above the discharge opening;
a chamber enclosing said plurality of blending units, the receiver cone of each blending unit being secured to and supported by said chamber, the lowermost of said chambers including a cone-shaped collector chute having an open lower end;
and a spout projecting downwardly from the collector chute and adapted to be projected into a bag for receiving the blended mixture of dry granulated material;
and respective power means connected to the discharge control cone of each blending unit adapted to shift the discharge control cones of the respective blending units successively to said elevated discharge position.

16. An apparatus for blending dry granulated material comprising:
a plurality of blending units disposed one above the other;
each of said blending units comprising an inverted receiver cone having a discharge opening at the lower portion thereof;
an upright discharge control cone disposed within the lower portion of the receiver cone and adapted to be shifted from a lowered charging position to an elevated discharge position;
means for feeding a mass of dry granulated material into the receiver cone of the upper of said blending units;

each of said discharge control cones having a base adapted to seat against the internal surface of the inverted receiver cone in which it is disposed when in said lowered charging position, whereby each discharge cone is adapted to confine a mass of dry granulated material in the receiver cone above the discharge opening;

a chamber enclosing said plurality of blending units, the receiver cone of each blending unit being secured to and supported by said chamber, the lowermost of said chambers including a cone-shaped collector chute having an open lower end;

a spout projecting downwardly from the collector chute and adapted to be projected into a bag for receiving the blended mixture of dry granulated material;

the collector chute having a deflector element disposed beneath the discharge opening of the lowermost receiver unit and adapted to intercept and deflect the material flowing from the discharge opening in an outward direction and against the internal surface of the collector chute;

and respective power means connected to the discharge control cone of each blending unit adapted to shift the discharge control cones of the respective blending units successively to said elevated discharge position.

17. An apparatus for blending dry granulated material comprising:

a plurality of blending units disposed one above the other;

each of said blending units comprising an inverted receiver cone having a discharge opening at the lower portion thereof;

an upright discharge control cone disposed within the lower portion of the receiver cone and adapted to be shifted from a lowered charging position to an elevated discharge position;

means for feeding a mass of dry granulated material into the receiver cone of the upper of said blending units;

each of said discharge control cones having a base adapted to seat against the internal surface of the inverted receiver cone in which it is disposed when in said lowered charging position, whereby each discharge cone is adapted to confine a mass of dry granulated material in the receiver cone above the discharge opening;

a chamber enclosing said plurality of blending units, the receiver cone of each blending unit being secured to and supported by said chamber, the lowermost of said chambers including a cone-shaped collector chute having an open lower end;

a spout projecting downwardly from the collector chute and adapted to be projected into a bag for receiving the blended mixture of dry granulated material;

a dust collector shroud partially enclosing the collector chute having an open lower end disposed adjacent the spout and including suction means connected to the shroud for collecting dust which may arise from the open end of the bag as the dry granulated material is charged therein;

and respective power means connected to the discharge control cone of each blending unit adapted to shift the discharge control cones of the respective blending units successively to said elevated discharge position.

References Cited
UNITED STATES PATENTS

| | | | |
|---|---|---|---|
| 860,031 | 7/1907 | Jones | 259—150 |
| 1,047,680 | 12/1912 | Simpson | 259—150 X |
| 1,072,143 | 9/1913 | Simpson | 259—150 |
| 2,179,485 | 11/1939 | Avril | 259—180 |

ROBERT W. JENKINS, *Primary Examiner.*